(No Model.)
J. AEGETER.
DOUGH OPERATING MACHINE.
No. 593,368.              Patented Nov. 9, 1897.
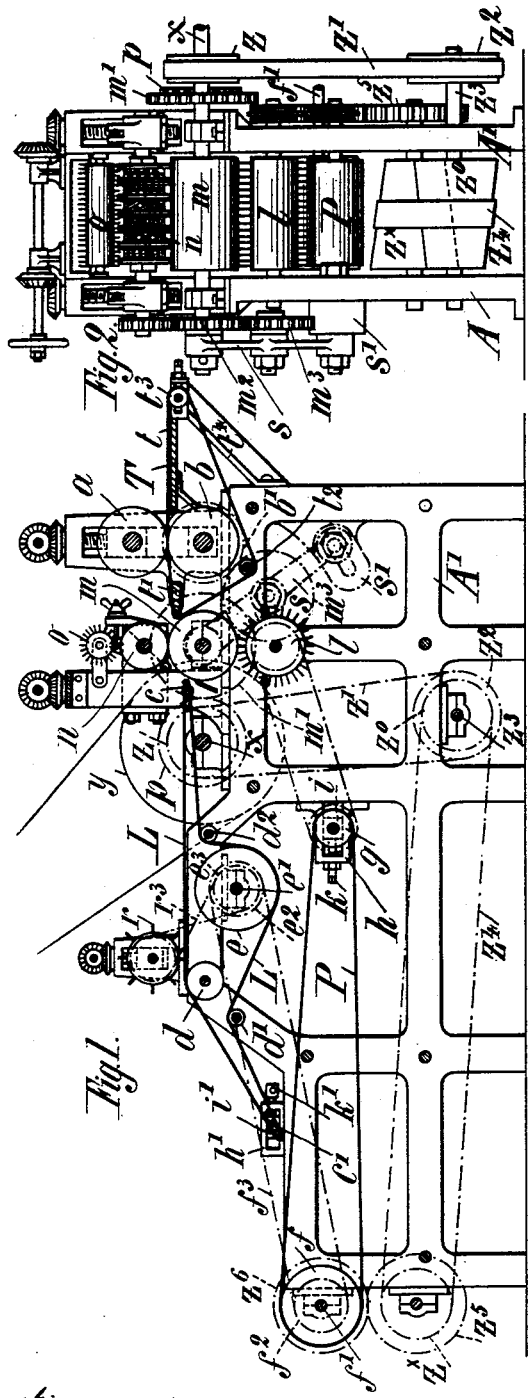
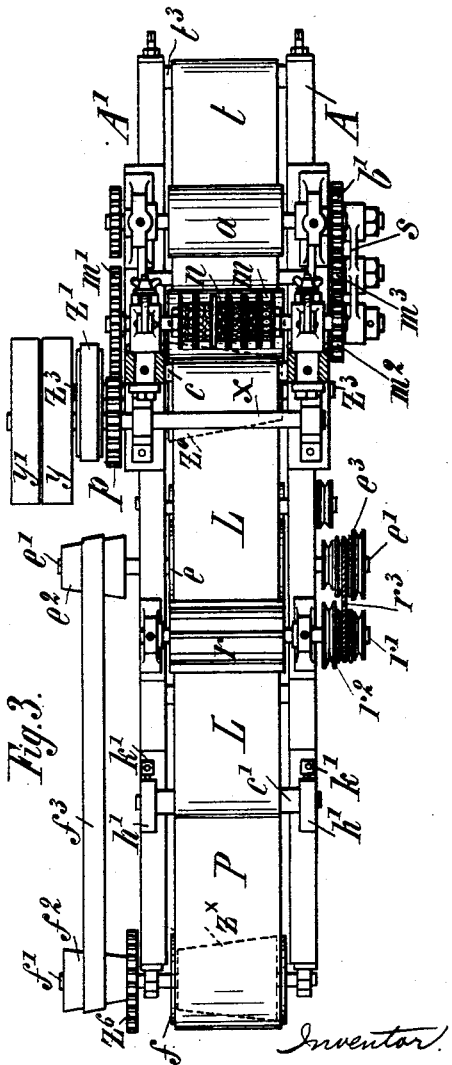
Witnesses
Inventor
Johann Aegeter

UNITED STATES PATENT OFFICE.

JOHANN AEGETER, OF HAMBURG, GERMANY.

DOUGH-OPERATING MACHINE.

SPECIFICATION forming part of Letters Patent No. 593,368, dated November 9, 1897.

Application filed May 22, 1897. Serial No. 637,746. (No model.) Patented in Germany March 19, 1893, No. 73,404; in Austria-Hungary September 11, 1893, No. 21,934 and No. 35,102; in France September 21, 1893, No. 232,968, and in England February 5, 1894, No. 2,530.

*To all whom it may concern:*

Be it known that I, JOHANN AEGETER, a citizen of the Swiss Republic, and a resident of Hamburg, in the German Empire, have invented certain new and useful Improvements in Dough-Operating Machines, (for which I have obtained a patent in Germany, No. 73,404, dated March 19, 1893; in Austria-Hungary, No. 21,934 and No. 35,102, dated September 11, 1893; in France, No. 232,968, dated September 21, 1893, and in Great Britain, No. 2,530, dated February 5, 1894,) of which the following is a specification.

My invention relates to improvements in machines for molding, decorating, perforating, and severing or cutting dough, and has for its object to replace the cut-out machines such as are employed more particularly in the manufacture of cakes and biscuits.

The machine provided with my present invention is distinguished from the machines hitherto in use by the following advantages: It provides for a continuous working; it produces without waste any desired and even perforated form of baking; it automatically effects the discharge of the ready-made pieces of dough into the pans at an ample distance from each other, so that the baking can be perfectly executed, and, finally, it admits the greasing of the baking-pans to be entirely dispensed with.

In order to make my invention more clearly understood, I will proceed to describe the same with reference to the accompanying drawings, in which—

Figure 1 is a sectional side elevation; Fig. 2, an end view, some parts being taken off for the sake of clearness; and Fig. 3, a top view, partly in section, of a machine made in accordance with my present invention.

At the front end of the machine, the frame of which is formed of the standards A and A', I provide a suitable plate or table T, designed to receive the duly-prepared dough and which may be pushed either by hand or automatically between a pair of rollers $a$ $b$, serving to roll out the dough to a layer of uniform thickness, and which is afterward conveyed to a second pair of rollers $n$ $m$, which are hereinafter called the "molding-rollers." The upper one, $n$, of these rollers is engraved according to the formation or decoration which the pastry shall receive, while the lower roller, $m$, is, as usual, smooth and merely designed to act as a kind of counter-roller. The dough pieces produced with the aid of these molding-rollers are preferably conveyed to an adjustable apron L, the first part of which, leading over a guide-bar $c$ contiguous to the lower one of the molding-rollers, travels horizontally, and the second obliquely, so as to direct the separate dough pieces into the usual baking-pans, which are suitably arranged on a second apron P, which is moved with a corresponding speed beneath the aforesaid apron L. (See Fig. 1.) The apron L is led over suitable guide-boards $c$ $c'$ and rollers $d$, $d'$, $d^2$, and $e$, of which the latter is designed to impart the required traveling motion to the apron. The lower apron P, however, is only guided by the rollers $f$ and $g$, of which the former serves as driving-roller, while the latter is journaled by a pair of movable bearings $i$, which are guided by brackets $h$, attached to the standards A A of the machine in order to admit the stretching of the apron if required. For the same purpose similar bearings $i'$, carrying the pivots at the extremities of the guide-board $c'$ of the apron L, are adapted to slide within the guides $h'$, supported by the standards A A'. To effect this, set-screws $k$ and $k'$ are provided for moving the bearings $i$ and $i'$, respectively, in their guides $h$ and $h'$. From this arrangement it will be seen that the dough pieces on the apron L are caused to drop by rows into correspondingly-arranged pans (not shown in the drawings) on the apron P as soon as they arrive at the outer edge of the guide-board $c'$ of the apron L, so that the dough pieces may be baked in the usual manner. The baking-pans, put on the apron P from the end of the machine at roller $f$, are carried along beneath the apron L and may be taken off from the former alongside of the machine.

If, instead of separate dough pieces, continuous pieces are to be produced by the molding-roller, such pieces may be conducted through the medium of the apron L beneath a rotating cutter $r$, having a number of radially-arranged knives which are designed to sever the said pieces transversely. The dough pieces so obtained are then forwarded and treated in the same manner as above mentioned with regard to the dough pieces directly formed by the said molding-rollers.

Motion is imparted to the several parts of the machine from the main driving-shaft $x$, carrying a loose and fast pulley $y$ $y'$. On this shaft is keyed a pinion $p$ and a belt-pulley $z$, the former meshing with a wheel $m'$ on the shaft of the roller $m$, the latter being connected through a belt $z'$ with the pulley $z^2$ on the intermediate shaft $z^3$, which serves to transmit motion by means of the cone-pulleys $z^o$ and $z^x$, a belt $z^4$, and the gearing $z^5$ $z^6$ onto the shaft $f'$ of the driving-roller $f$ of the apron P. To the one end of the shaft $f'$ is fastened a drum $f^2$, designed to actuate the apron L through the medium of the belt $f^3$ and of the drum $e^2$, keyed on the driving-shaft $e'$ of the roller $e$, thus making the traveling motion of the apron L dependent upon that of the apron P; but in order to compensate certain irregularities in the motion of the one apron in relation to the other, or to easily proportionate the speed of one apron to the other, I make the drums $e^2$ and $f^2$ conical in opposite direction, so that on shifting the belt $f^3$ accordingly the speed of the one apron may be made more or less in relation to that of the other.

At the opposite end of the shaft $e'$ a step-pulley $e^3$ is provided, corresponding with a step-pulley $r^2$ on the shaft $r'$ of the rotating cutter $r$, which is thus actuated through the medium of a belt or rope $r^3$ from the shaft $e'$ of the driving-roller of the apron L.

In conformity with the motion of the aprons L and P the activity of the molding-rollers $m$ $n$, as well as that of the rollers $a$ $b$, for rolling out the dough are made depending upon the speed of the main driving-shaft $x$, since the wheel $m^2$, keyed onto the end of the shaft of the molding-roller $m$ opposite of the wheel $m'$, meshes through the medium of an intermediate wheel $m^3$ with the wheel $b'$ on the shaft of the roller $b$, and the roller $a$ is made to partake of the motion of the roller $b$ in consequence of a pair of wheels engaging one with the other and fastened to the other ends of their shafts. The intermediate wheel $m^3$ is designed to admit the wheel $b'$ on the shaft of the roller $b$ to be exchanged by other wheels of different size, in order to regulate the speed of the rolling-out rollers $a$ $b$ in proportion to the capacity of the molding-rollers $m$ $n$, and for this purpose the wheel $m^3$ is carried by a traverse $s$, being at its upper end suspended by the shaft of the molding-roller $m$ and at its lower end adjustably connected to a slotted bracket $s'$ of the standard A. Consequently the position of the traverse $s$ may be easily altered, according to the size of the wheels employed on the shaft of the roller $b$.

Whenever it is desired to feed the dough automatically to the rollers $a$ $b$, an endless band $t$, passing between and being actuated by the rollers $a$ $b$, is provided. This band is led over the guide-board $t'$ contiguous to the molding-roller $m$, the roller $t^2$ beneath the roller $b$, and the front guiding-roller $t^3$, the latter being journaled by adjustable bearings carried by suitable brackets $t^4$ of the standards A A', in order to admit stretching of the band $t$ if required. In contact with the molding-rollers rotating brushes, such as $l$ and $o$, may be provided, which are adapted to clean the said rollers and to grease the same in order to facilitate the delivering of the dough pieces from the engraved molding-roller and at the same time to prevent them sticking to the lower molding-roller and to the apron. Consequently the greasing of the baking-pans as hitherto effected may be entirely dispensed with.

Having now particularly described and ascertained the nature of my said invention and in what manner the same is to be performed, I declare that what I claim is—

1. The combination with continuously-revoluble feed-rolls, continuously-revoluble bed, and molding, and cutting rolls, and a continuously-movable receiving-apron arranged to travel in a horizontal plane away from the molding-rolls and then in a downwardly-inclined plane; of a continuously-movable delivery-apron arranged to travel in a reversely-inclined plane below said receiving-apron, for the purpose set forth.

2. The combination with continuously-revoluble feed-rolls, continuously-revoluble cooperating bed and molding rolls, suitable delivery-aprons and means for spreading grease on the molding-roll and for stripping dough scraps from said roll and from its bed-roll, for the purpose set forth.

3. The combination with continuously-revoluble feed-rolls, and a continuously-movable feed-apron, of continuously-revoluble bed and molding rolls, a receiving-table, a cutting-table, a belt adapted to continuously travel from the bed and molding roll over said table, and a continuously-revoluble cutter having knives parallel with its axis of rotation, coöperating with the apron and table, for the purpose set forth.

4. The combination with continuously-revoluble feed-rolls, continuously-revoluble and coöperating bed and molding rolls, a continuously-movable delivery-apron, a like receiving-apron arranged to take the molded dough and deliver the same onto the delivery-apron, and speed-changing appliances for changing the relative speed of said aprons or the speed of one or both aprons relatively to the speed of the feed and molding appliances, substantially as and for the purpose set forth.

In testimony that I claim the foregoing as my invention I have signed my name, in presence of two witnesses, this 6th day of May, 1897.

JOHANN AEGETER.

Witnesses:
MAX LEMCKE,
WILHELM OECHSLER.